(12) United States Patent
Okumura

(10) Patent No.: US 9,807,616 B2
(45) Date of Patent: Oct. 31, 2017

(54) ELECTRONIC APPARATUS AND CONTROL METHOD THEREOF

(71) Applicant: KABUSHIKI KAISHA TOSHIBA, Minato-ku, Tokyo (JP)

(72) Inventor: Akihito Okumura, Kodaira Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/256,158

(22) Filed: Sep. 2, 2016

(65) Prior Publication Data
US 2017/0180992 A1 Jun. 22, 2017

(30) Foreign Application Priority Data
Dec. 17, 2015 (JP) ................. 2015-245876

(51) Int. Cl.
*H04M 3/16* (2006.01)
*H04W 12/08* (2009.01)
*H04W 4/00* (2009.01)
*H04L 12/18* (2006.01)

(52) U.S. Cl.
CPC ........... *H04W 12/08* (2013.01); *H04W 4/008* (2013.01); *H04L 12/189* (2013.01)

(58) Field of Classification Search
USPC ........................................ 455/411
See application file for complete search history.

(56) References Cited

U.S. PATENT DOCUMENTS

2014/0108799 A1* 4/2014 Wang ................ G06F 21/32
713/168

\* cited by examiner

*Primary Examiner* — Joel Ajayi
(74) *Attorney, Agent, or Firm* — Rutan & Tucker, LLP

(57) ABSTRACT

According to one embodiment, an electronic apparatus has a communication circuitry, a memory and a processor. The circuitry communicates with terminals by short-distance wireless communication in accordance with a wireless communication standard. The memory stores first security data of a first terminal and second security data of a second terminal. The processor receives a command to lock or unlock an electronic locking, waits for any security data to be received from the terminals for a period after a reception of the command, accepts the command if the first and second security data is received for the period, and rejects the command if at least one of the first and second data is not received for the period.

8 Claims, 5 Drawing Sheets

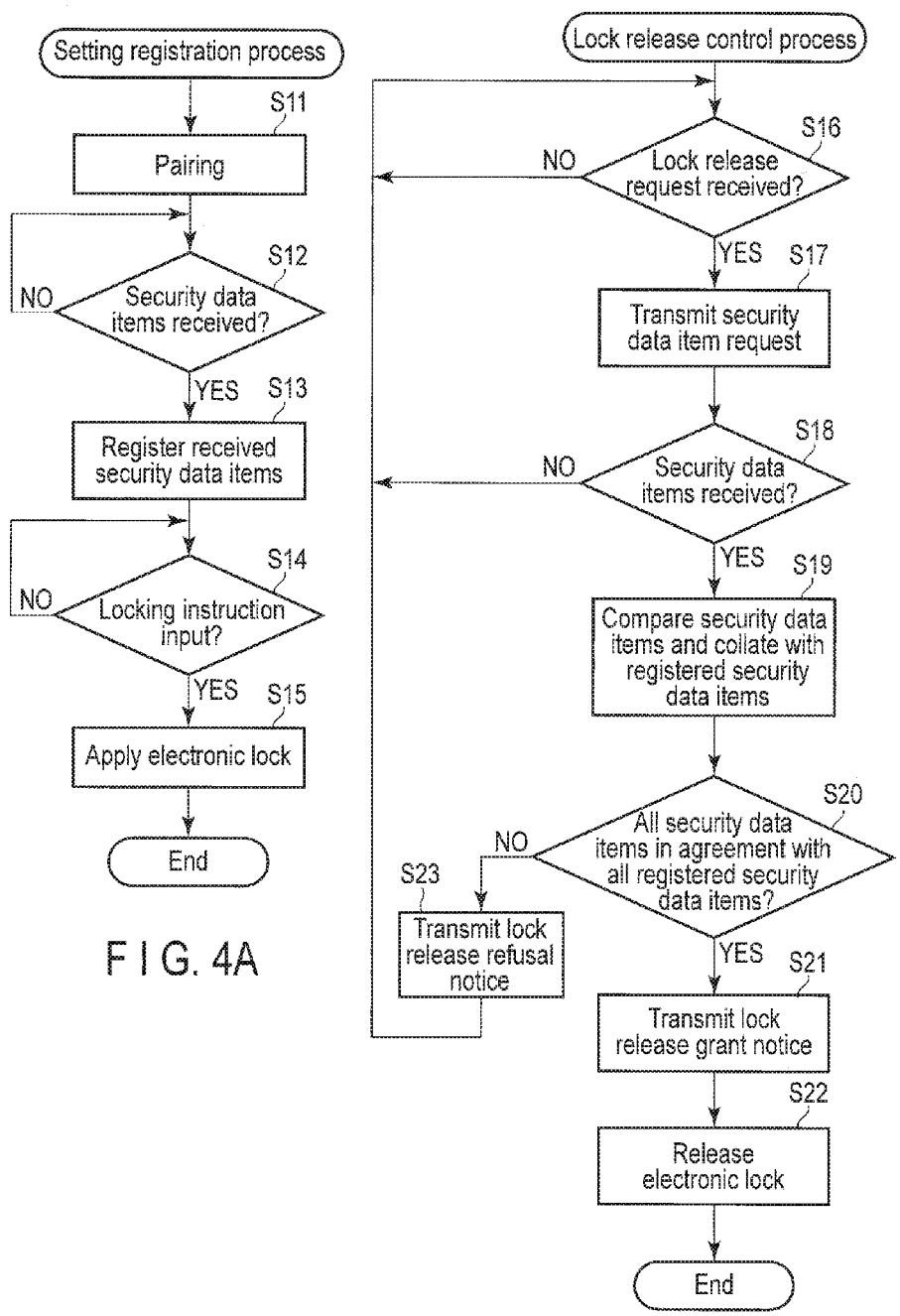
F I G. 4A
F I G. 4B

ELECTRONIC APPARATUS AND CONTROL METHOD THEREOF

CROSS-REFERENCE TO RELATED APPLICATIONS

This application is based upon and claims the benefit of priority from Japanese Patent Application No. 2015-245876, filed Dec. 17, 2015, the entire contents of which are incorporated herein by reference.

FIELD

Embodiments described herein relate generally to an electronic apparatus and its control method.

BACKGROUND

A portable communication terminal, such as a smartphone, normally has a short-range communication device which generally uses Bluetooth (Registered Trademark) (hereinafter referred to as a "Bluetooth device"). The Bluetooth device has a function of notifying peripheral devices of what kind of device it is. For example, it may have for achieving such a function not only a mechanism of Inquiry or Advertising but also a region for storing a unique identification data item to be notified to the peripheral devices.

On the other hand, an electronic lock which is installed in an electronic apparatus and electronically locks a specific process operation of the electronic apparatus is put in practical use. Moreover, a technical specification for controlling the electronic lock is released, in which not only the electronic lock but also the Bluetooth device is installed in the electronic apparatus and instructions of releasing or applying the electronic lock are sent from the portable communication terminal to the electronic apparatus using one of the functions of Bluetooth Low Energy (BLE).

The electronic lock which uses Bluetooth follows the technical specification, in which the unique identification data item is given to the Bluetooth device, which is incorporated in and paired with the portable communication terminal, and is registered with the electronic apparatus. When an electronic lock release request is given to the electronic apparatus from the portable communication terminal paired with the Bluetooth device along with the unique identification data item given to the Bluetooth device, the identification data item is collated with the registered identification data item. When it is confirmed that they are in agreement with each other, the electronic lock is released.

The electronic lock installed in the above-mentioned electronic apparatus has an advantage of not requiring a user to carry a specifically prepared hard key with him or her. However, the electronic lock will be released only by a single unique identification data item given to the Bluetooth device which the portable communication terminal has. Accordingly, when strict safety must be secured, there arises a problem that the electronic lock lacks reliability.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4A and FIG. 4B consist of two flow charts illustrating two different processes, which the first embodiment of the electronic lock in the electronic apparatus illustrated in FIG. 2 performs.

DETAILED DESCRIPTION

Various embodiments will be described hereinafter with reference to the accompanying drawings. In general, according to one embodiment, an electronic apparatus includes communication circuitry, a memory and at least one hardware processor. The communication circuitry communicates with terminals by short-distance wireless communication in accordance with a wireless communication standard. The memory stores first security data of a first terminal and second security data of a second terminal. The hardware processor receives a command to lock or unlock an electronic locking, waits for any security data to be received through the communication circuitry from the terminals for a period after a reception of the command, accepts the command if the first security data and the second data is received by the communication circuitry for the period and rejects the command if at least one of the first security data and the second data is not received by the communication circuitry for the period.

Embodiments will be described hereinafter with reference to the accompanying drawings.

Figure 1:
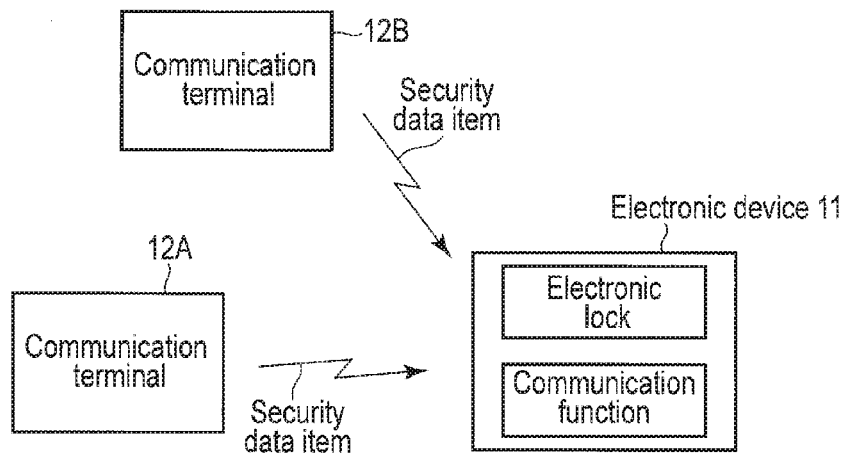
FIG. 1 is a block diagram structurally illustrating an electronic lock system, to which an electronic lock of an electronic apparatus in an embodiment is applied.

FIG. 1 is a block diagram structurally illustrating an electronic lock system, to which an electronic lock of an electronic apparatus in an embodiment is applied. In FIG. 1, 11 denotes an electronic apparatus which has an electronic lock and unlock function and a communication function using a Bluetooth device. In an electronic lock and unlock function, an unlock request may be received through the Bluetooth device, and will be examined if it meets a certain requirement. If it is determined that the unlock request meets the certain requirement, then an electronic lock will be electronically released. A process which manages releasing and applying of a passage gate, log-in of a communication facility, etc., may be mentioned as an exemplary application of the electronic lock. The following explanation will be given on the assumption that the electronic lock is already applied.

Figure 2:
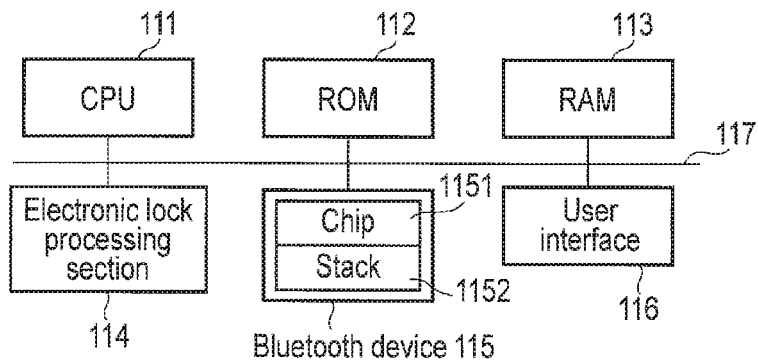
FIG. 2 is a block diagram structurally illustrating the electronic apparatus of the system illustrated in FIG. 1.

FIG. 2 is a block diagram illustrating a specific structure of the above-mentioned electronic apparatus 11. The electronic apparatus 11 comprises a central processing unit (CPU) 111, a program storing Read Only Memory (ROM) 112, a working Random Access Memory (RAM) 113, an electronic lock processing section 114, a Bluetooth device 115, and a user interface 116. These elements are connected to each other through a bus 117.

ROM 112 is stored with an electronic lock processing program. According to an electronic lock start instruction input through the user interface 116, CPU 111 loads the processing program. CPU 111 uses a workspace which RAM 113 has, and makes the electronic lock processing section 114 execute a series of processes.

The electronic lock processing section 114 consults requirements for electronically releasing the electronic lock every time an unlock request is received, and electronically releases the electronic lock when the request meets the requirements.

The Bluetooth device 115 has a Bluetooth chip (integrated circuit) 1151 for receiving a notified data item and a Bluetooth stack (temporary storage) 1152 required for processing received BLE Advertising or Bluetooth EIR. When a setting is registered, the number of security data items required to unlock the electronic lock is stored in the Bluetooth stack 1152. (Here, let us assume that there are two security data items, a first security data item and a second security data item.)

In FIGS. 1, 12A and 12B respectively denote a first security communication terminal and a second security communication terminal, each having a Bluetooth device (hereinafter they are described as communication terminals). The communication terminals 12A and 12B may be provided as dedicated devices. However, the existing communication terminals, such as smartphones, may be used as the communication terminals 12A and 12B.

Figure 3:
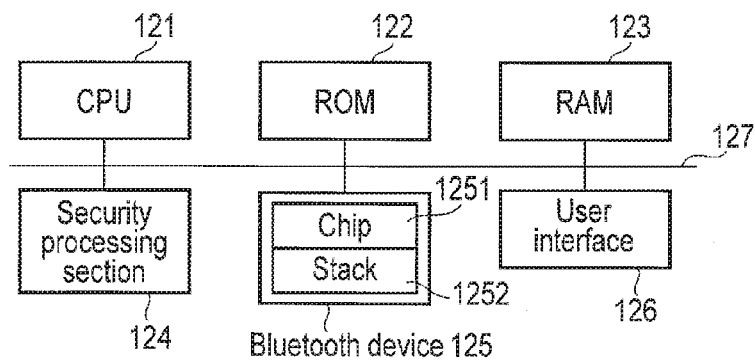
FIG. 3 is a block diagram structurally illustrating an exemplary security terminal of the system illustrated in FIG. 1.

The first security communication terminal 12A is fundamentally the same in structure as the second security communication terminal 12B. As illustrated in FIG. 3, each of them has a CPU 121, a ROM 122 for program storage, a RAM 123 for working storage, a security processing section 124, a Bluetooth device 125, and a user interface 126. These elements are connected to one another via a bus 127.

ROM 122 is stored with a security processing program (an application). CPU 121 loads the security processing program according to instructions that have been input via the user interface 126 and request to electronically release the electronic lock. CPU 121 causes the security processing section 124 to edit the notice contents which request to electronically release the electronic lock with using the workspace of RAM 123.

The Bluetooth device 125 is required to transmit Bluetooth Extended Inquiry Response (Bluetooth EIR) or Bluetooth Low Energy Advertising (BLE Advertising). Therefore, it has a Bluetooth chip 1251 for transmitting a data notice, and a Bluetooth stack 1252 for transmitting via BLE Advertising or Bluetooth EIR notice contents which should be notified. A piece of data which is transmitted via one of Bluetooth EIR and BLE Advertising may also include a security data item, in which a Bluetooth address of a transmitting device is included. The first terminal 12A stores a first security data item in the Bluetooth stack 1252 as notice contents which should be notified. Similarly, the second terminal 12B stores a second security data item in the Bluetooth stack 1252 as notice contents which should be notified.

First Embodiment

Figure 5A:
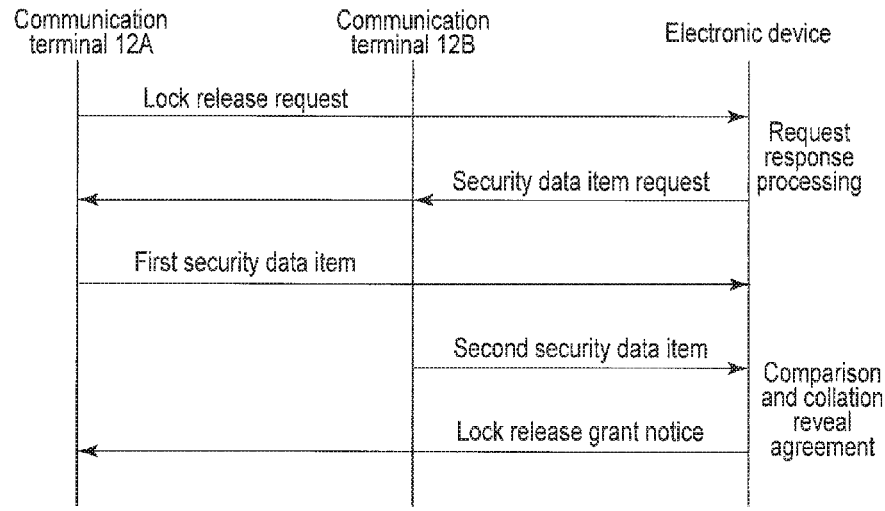
FIG. 5A and FIG. 5B consist of two sequence diagrams illustrating how data flows through the elements of the electronic lock system illustrated in FIG. 1 under two different conditions in the first embodiment.
Figure 5B:
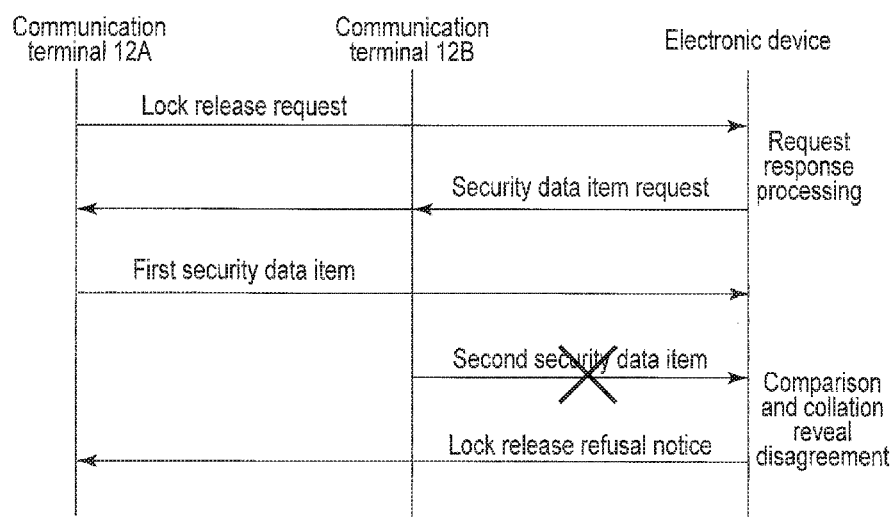

FIG. 4A and FIG. 4B illustrate the respective flows of a locking process and an unlocking process, both of which are executed by the electronic lock processing program of the electronic apparatus 11 in the system constituted as mentioned above. FIG. 5A and FIG. 5B illustrate the exchange of communication between the electronic apparatus 11, the first security communication terminal 12A, and the second security communication terminal 12B. How the electronic lock in the first embodiment is applied or released will be explained with reference to these figures. It should be noted that FIG. 5A illustrates a case where unlocking is granted, whereas FIG. 5B illustrates a case where unlocking is refused.

The electronic lock processing program of the electronic apparatus 11 is roughly classified into a setting registration process illustrated in FIG. 4A and a lock release control process illustrated in FIG. 4B. In the setting registration process, the first security communication terminal 12A and the second security communication terminal 12B are paired at first (Step S11). A first security data item and a second security data item are respectively received from the first security communication terminal 12A and the second security communication terminal 12B (Step S12). The received security data items are registered with the Bluetooth stack 1152 (Step S13). After the registration has been completed, a request to apply the electronic lock is input (Step S14). The electronic lock is applied (Step S15).

Let us suppose that the lock release control process begins with a lock release request waiting mode (Step S16). Upon receipt of a lock release request transmitted from the first or the second security communication terminal 12A or 12B under such a condition, a security data items request is sent out in response to the lock release request (Step S17). A security data items waiting mode is established and remains for a predetermined time (Step S18). When the predetermined time has passed and neither the first security data item nor the second security data item has been received, the security data items waiting mode of Step S18 is canceled and the lock release request waiting mode of Step S16 is reestablished.

Upon receipt of a first security data item and a second security data item within the predetermined time in Step S18, each of the security data items having been sent out by a corresponding one of the first security communication terminal 12A and the second security communication terminal 12B in response to the security data items request, the received data items are collated with registered security data items that are registered with the Bluetooth stack 1152 (Step S19). In this collation, it is determined whether each of the first security data item and the second security data item is in agreement with a corresponding one of the registered security data items (Step S20). If it is determined that each of the first security data item and the second security data item is in agreement with a corresponding one of the registered security data items, a lock release grant notice will be transmitted (Step S21), and the electronic lock will be released (Step S22). In contrast, if whichever of the first security data item and the second security data item should be different from any of the registered data items, the electronic lock will not be released, a lock release refusal notice will be transmitted (Step S23), and the lock release request waiting mode of Step S16 will be reestablished.

The electronic lock in the present embodiment will be released for the first time if a first security data item and a second security data item respectively transmitted from the first security communication terminal 12A and the second security communication terminal 12B in response to a security data items request are received and are compared or collated with registered security data items that are registered with the Bluetooth stack 1152 on condition that the first security communication terminal 12A and the second security communication terminal 12B are located near the electronic apparatus 11, and if each of the first security data item and the second security data item is in agreement with a corresponding one of the registered security data items. Namely, the electronic lock will not be released unless the two registered security communication terminals 12A and 12B are located near the electronic apparatus 11. Therefore, security will be greatly improved in comparison with the conventional electronic lock, in which only a single communication terminal is required to release or apply an electronic lock.

It should be noted that, upon refusal to release the lock, the electronic lock processing program may notify a security communication terminal having transmitted a legitimate security data item of the reason for refusal to release the lock. For example, there may be a case where a security data item has been received from the first security communication terminal 12A and has been already identified as a legitimate one, but a security data item that is expected to be supplied from the second security communication terminal 12B has not been received yet. In such a case, the electronic lock processing program may notify the first security communication terminal 12A that the security data item having been supplied from the first security communication terminal 12A has been identified as a legitimate one but a security data item that is expected to be supplied from the second security communication terminal 12B has not been received yet.

Alternatively, there may be a case where a security data item having been supplied from the first security communication terminal 12A has been successfully identified, but the identification of a security data item having been supplied from the second security communication terminal 12B has failed. In such a case, the electronic lock processing program may notify the first security communication terminal 12A that the security data item having been supplied from the first security communication terminal 12A has been successfully identified but the security data item having been supplied from the second security communication terminal 12B has failed in identification.

Second Embodiment

Figure 6:
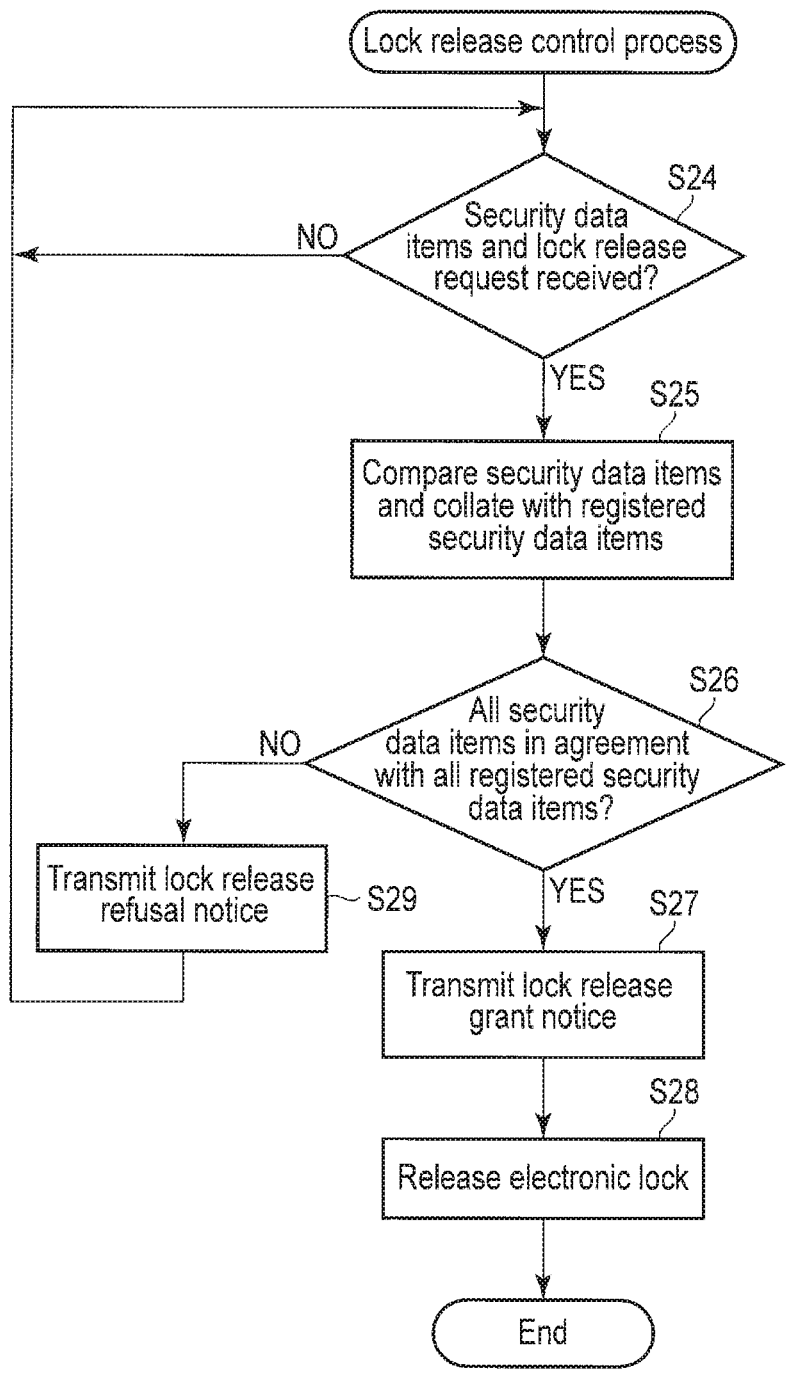
FIG. 6 is a flow chart illustrating how a process of a second embodiment of the electronic lock in the electronic apparatus illustrated in FIG. 2 proceeds.
Figure 7A:
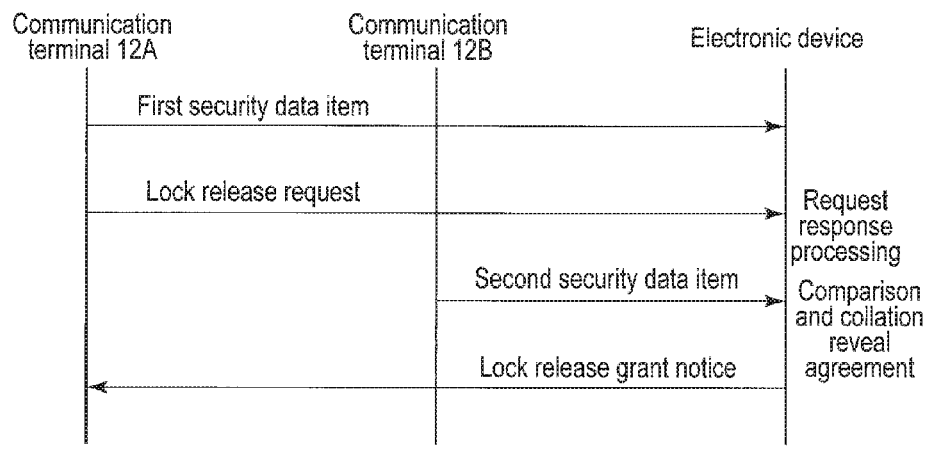
FIG. 7A and FIG. 7B consist of two sequence diagrams illustrating how data flows through the elements of the electronic lock system illustrated in FIG. 1 under two different conditions in the second embodiment.
Figure 7B:
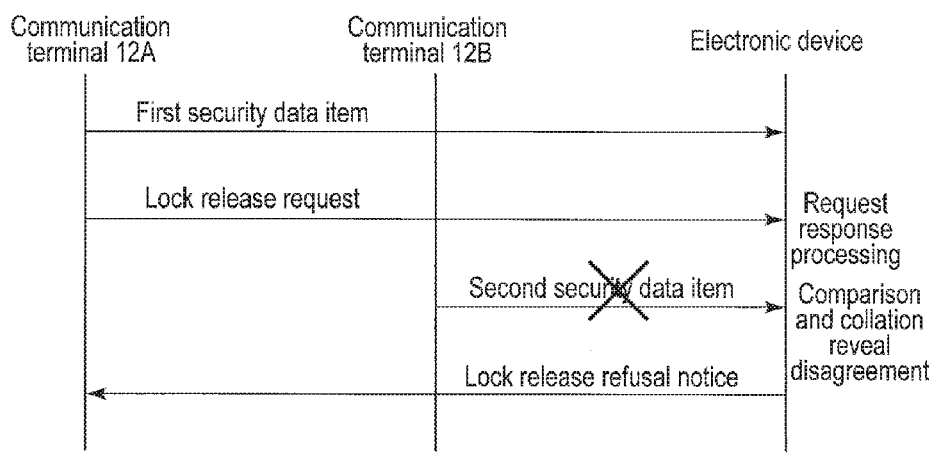

The above-mentioned lock release control process starts on condition that a lock release request is received, but it is possible that a lock release control process may start on condition that a security data item has been successfully identified. FIG. 6 illustrates the flow of a lock release control process which an electronic lock processing program of the electronic apparatus 11 executes in this case. FIG. 7A and FIG. 7B illustrate the exchange of communication between the electronic apparatus 11 and each of the first and second security communication terminals 12A and 12B. The release procedure of an electronic lock in a second embodiment will be explained. It should be noted that FIG. 7A illustrates a case where unlocking is granted, whereas FIG. 7B illustrates a case where unlocking is refused. The second embodiment is the same as the first embodiment in respect of a locking process. Therefore, explanation of the locking process is omitted. Moreover, various other processes which are not specified in FIG. 6 and FIG. 7A and FIG. 7B correspond to various other processes of the first embodiment, so that the various other processes of the first embodiment may be applicable to the corresponding various other processes of the second embodiment.

Let us suppose that a lock release control process in the electronic lock processing program of the electronic apparatus 11 starts with a waiting mode in which receipt of security data items and a lock release request is waited for (Step S24). When security data items and a lock release request are received in this state, each of the received security data items will be compared or collated with a corresponding one of the registered security data items (Step S25). It is determined whether all the received security data items are in agreement with all the registered security data items (Step S26). When it is determined that all the received security data items are in agreement with all the registered security data items, a notification that unlocking is granted is transmitted (Step S27), the electronic lock is released (Step S28), and a series of processes are ended. In contrast, when it is determined that there is no complete agreement between all the received security data items and all the registered security data items, a notification that unlocking is refused is transmitted to the first security communication terminal 12A (Step S29), and the process returns to the initial waiting state of Step S24.

Specifically, let us assume that the first security communication terminal 12A and the second security communication terminal 12B are near the electronic apparatus 11. As illustrated in FIG. 7A, the first security communication terminal 12A transmits a first security data item to the electronic apparatus 11. Subsequently, the first security communication terminal 12A transmits a lock release request to the electronic apparatus 11. After that, the second security communication terminal 12B transmits a second security data item to the electronic apparatus 11. In the electronic apparatus 11, therefore, the first security data item and the second security data item are successively received. All the received security data items are compared and collated with all the registered security data items. When it is determined that each of the received security data items is in agreement with a corresponding one of the registered security data items, a notification that unlocking is granted is transmitted. The electronic lock is released. In contrast, FIG. 7B illustrates a case where a second security data item is not received. In this case, a perfect agreement between all the received security data items and all the registered security data items cannot be obtained. Therefore, a notification that unlocking is refused is transmitted to the first security communication terminal 12A. The process returns to the initial waiting state.

When the above-mentioned embodiment is put into practice using Bluetooth LE or Bluetooth, it may be possible to send a security data item via BLE Advertising or Bluetooth EIR. In such a case, it is possible that EIR or Advertising, in which a security data item is included, may be transmitted before a predetermined profile of Bluetooth establishes a communication connection, and, after the connection has been established by the profile, an electronic lock release request may be transmitted using the profile.

The electronic lock in the present embodiment requires that both the first and second security communication terminals 12A and 12B are near the electronic apparatus 11. The electronic apparatus 11 successively receives a first security data item and a lock release request transmitted from the first terminal 12A. The electronic apparatus 11 further receives a second security data item transmitted from the second terminal 12B. The electronic apparatus 11 compares or collates the first and second security data items with the registered security data items. The electronic lock will be released for the first time when it is determined that each of the first and second security data items are in agreement with a corresponding one of the registered security data items. Thus, an electronic lock in this embodiment will not be released unless both the registered security communication terminals 12A and 12B are near the electronic apparatus 11. Therefore, security improves remarkably in comparison with the conventional electronic lock system in which only one communication terminal is used to grant unlocking.

The electronic lock processing program may be prepared as follows. The distance between the electronic apparatus 11 and one or each of the first and second security communication terminals 12A and 12B is measured. When each of the values obtained by measuring the respective distances is smaller than a predetermined value, the electronic lock is released.

It should be noted that distance may be determined in accordance with, for example, the strength of a wireless signal. Alternatively, distance may be determined based on the communication mode. That is, for example, when one or each of the security communication terminals 12A and 12B transmits a lock release request, a security data item, etc., via proximity wireless communication protocols, such as NFC protocols, it is determined that the terminal concerned is at a short distance.

Alternatively, the electronic lock processing program may require at least one of the terminals to transmit a lock release request or a security data item in accordance with a predetermined proximity wireless protocol, such as an NFC protocol.

Each of the embodiments described above uses two security communication terminals. However, it is also possible to use more than two terminals and to control an electronic lock using many security data items. Moreover, the electronic lock in each of the above embodiments can be used for not only releasing but also applying. That is, it is possible to apply an electronic lock after it has been confirmed that all security data items transmitted from several security communication terminals are in agreement with all registered security data items.

An exemplary practical use, in which two mobile phone units are used, will be given. An electronic lock application is installed into each of the two mobile phone units, and two security data items for releasing an electronic lock are registered with the electronic apparatus using the installed respective electronic lock applications. In this way, the two mobile phone units constitute two security communication terminals, a first one and a second one. The electronic lock will be released for the first time if both the two mobile phone units are near the electronic apparatus and lock release requests are transmitted form the two mobile phone units to the electronic apparatus.

Either of the above embodiments may be applicable to each of the following specific cases.

(1) A room is intended to be exclusively used for a work which requires at least two persons to be present because of safety and hygiene. In such a case, attachment of an electronic lock in either of the above embodiments to a door which the room has makes it easy to mange safety and hygiene, because the electronic lock requires at least two persons to be present at the door in order to enter the room through the door.

(2) A room is intended to be used for keeping valuables and nobody is allowed to enter the room alone. In such a case, attachment of an electronic lock in either of the above embodiments to the door of the room easily makes it possible to surely prevent anybody from singly entering the room. Therefore, any incautious suspicion will be prevented from arising.

(3) A guest is put up at a host house. In such a case, an electronic lock in either of the above embodiments is attached to the door of the host house, and the guest and the host each carry a security communication terminal with him or her when they go out. The guest can release the electronic lock of the host house only when the host stays at home or the guest is accompanied by the host.

Specific process operation to which an electronic lock in each of the above embodiments is applicable is not limited to the above exemplary specific cases, but includes the operation of another Bluetooth apparatus. For example, each of the above two embodiments may also be applicable to a case where audio-streaming of a piece of music within a mobile phone unit (a first security communication terminal) is performed between the mobile phone unit and a Bluetooth loudspeaker set (an electronic apparatus having an electronic lock function). In such a case, either of the embodiments may be used in such a manner that a Bluetooth wristband (a second security communication terminal) is required to be near the Bluetooth loudspeaker (a user is required to be near the Bluetooth loudspeaker) in order to start streaming.

As mentioned above, each of the above embodiments requires a plurality of security communication terminals to release an electronic lock. Accordingly, both the embodiments make it possible to create various requirements for releasing the electronic lock. The security of the electronic lock will be very high.

It should be noted that each of the embodiments can be put into practice using Internet Protocol (IP) besides Bluetooth. Namely, the same situation as that of each of the above-mentioned embodiments will be created only by making an electronic apparatus inquire peripheral devices using the multicasting function of Internet Protocol (IP).

IP multicasting makes it possible to simultaneously distribute data items by a single stream. Accordingly, it is a bandwidth saving technology which reduces traffic. Let us assume here that there is a protocol called "Lock Protocol" as an electronic lock protocol, in which UDP is used for a transport layer and 1234 is used for a port number.

Specifically, an electronic lock issues a multicast packet from the following port to the following address in a network layer called LockProtocol-UDP-IP:

IP Address: 223.0.0.1
Port: 1234

The security communication terminal using port 1234 can return a response to the electronic lock by making use of "Lock Protocol." This makes it possible to release an electronic lock with the help of a plurality of communication terminals similarly to each of the above embodiments which uses Bluetooth technology. Security will be considerably improved.

The embodiments have been thus far explained as an electronic lock, but may be put into practice as a function of electronically restricting a certain operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
communication circuitry configured to communicate with a terminal in accordance with a wireless communication standard;
a memory configured to store first security data associated with a first terminal and second security data associated with a second terminal; and
at least one hardware processor configured to:
receive a request to unlock at least part of a function of an electronic locking, the request generated according to a user operation;
determine whether the first terminal is located within a distance based on a check by the at least one hardware processor using both the first security data and a first wireless signal received by the communication circuitry;
determine whether the second terminal is located within the distance based on a check by the at least one hardware processor using both the second security data and a second wireless signal received by the communication circuitry;
accept the request when both the first terminal and the second terminal are located within the distance; and
reject the request when at least one of the first terminal and the second terminal is not located within the distance.

2. The electronic apparatus of claim 1, wherein the processor transmits a control refusal answer if rejecting the request.

3. The electronic apparatus of claim 1, wherein the communication circuitry adopts Bluetooth (Registered Trademark) as the wireless standard, and communicates with terminals via one of Bluetooth Extended Inquiry Response (Bluetooth EIR) and Bluetooth Low Energy Advertising (BLE Advertising).

4. The electronic apparatus of claim 1, wherein the communication circuitry adopts a multicast function of the Internet Protocol, and the processor inquires of the terminals about the security data items using the multicast function of the Internet Protocol.

5. A control method of controlling an electronic apparatus, the control method comprising:
receiving a request to unlock at least part of a function of an electronic locking, the request generated according to a user operation;
determining whether a first terminal is located within a distance based on a check by at least one hardware processor in the electronic device using both first security data and a first wireless signal associated with the first terminal and received by the communication circuitry;
determining whether a second terminal is located within a distance based on a check by at least one hardware processor in the electronic device using both second security data and a second wireless signal associated with the second terminal and received by the communication circuitry;
accepting the request when both the first terminal and the second terminal are located within the distance; and
rejecting the request when at least one of the first terminal and the second terminal is not located within the distance.

6. The control method of claim 5, wherein transmitting a control refusal answer if rejecting the request.

7. The control method of claim 5, wherein adopting Bluetooth (Registered Trademark) as the wireless standard, and communicating with terminals via one of Bluetooth Extended Inquiry Response (Bluetooth EIR) and Bluetooth Low Energy Advertising (BLE Advertising).

8. The control method of claim 5, wherein adopting a multicast function of the Internet Protocol, and inquiring of the terminals about the security data items using the multicast function of the Internet Protocol.

* * * * *